April 18, 1961 F. C. BEURER 2,979,968
POWER TRANSMISSION SYSTEM
Filed Aug. 28, 1958 2 Sheets-Sheet 1

INVENTOR
FREDERICK C. BEURER
BY Jack N McCarthy
AGENT

April 18, 1961      F. C. BEURER      2,979,968

POWER TRANSMISSION SYSTEM

Filed Aug. 28, 1958      2 Sheets-Sheet 2

INVENTOR
FREDERICK C. BEURER
BY *Jack N. McCarthy*
AGENT 2,979,968
Patented Apr. 18, 1961

2,979,968
POWER TRANSMISSION SYSTEM

Frederick C. Beurer, Hamden, Conn., assignor to United Aircraft Corporation, East Hartford, Conn., a corporation of Delaware Filed Aug. 28, 1958, Ser. No. 757,881

15 Claims. (Cl. 74—665)

This invention relates to a power transmission system for a helicopter in which the power plant for the helicopter can drive the accessories alone or drive them through the main rotor shaft.

An object of this invention is to provide a transmission system which will permit the location of engine accessories such as generators, pumps, and tachometers to be away from heated areas.

Another object of this invention is to provide a transmission system which will permit the aircraft power plant to drive the accessories without driving the rotor drive shaft.

A further object of this invention is to provide a transmission system for aircraft having at least two engines in which one engine can be used to drive the accessories independently of the other engine and the rotor drive shaft.

Another object of this invention is to provide a transmission system which permits a second engine to be started while the first engine is driving the accessories and take over the driving of the accessories through the rotor drive shaft.

A further object of this invention is to provide means for connecting the drive of the first engine with that of the second engine so that the both of them will be driving the rotor drive shaft and accessories.

Another object of this invention is to provide means for connecting or disconnecting the drive of one engine with the rotor drive shaft so that one engine can be selectively used to drive either a group or accessories by themselves or through the rotor drive shaft.

A further object of this invention is to provide a transmission system which will permit the rotation of the main rotor drive shaft to operate the accessories during autorotation.

Other objects or advantages will be apparent from the specification and from the accompanying drawings which illustrate the invention.

Figure 1:
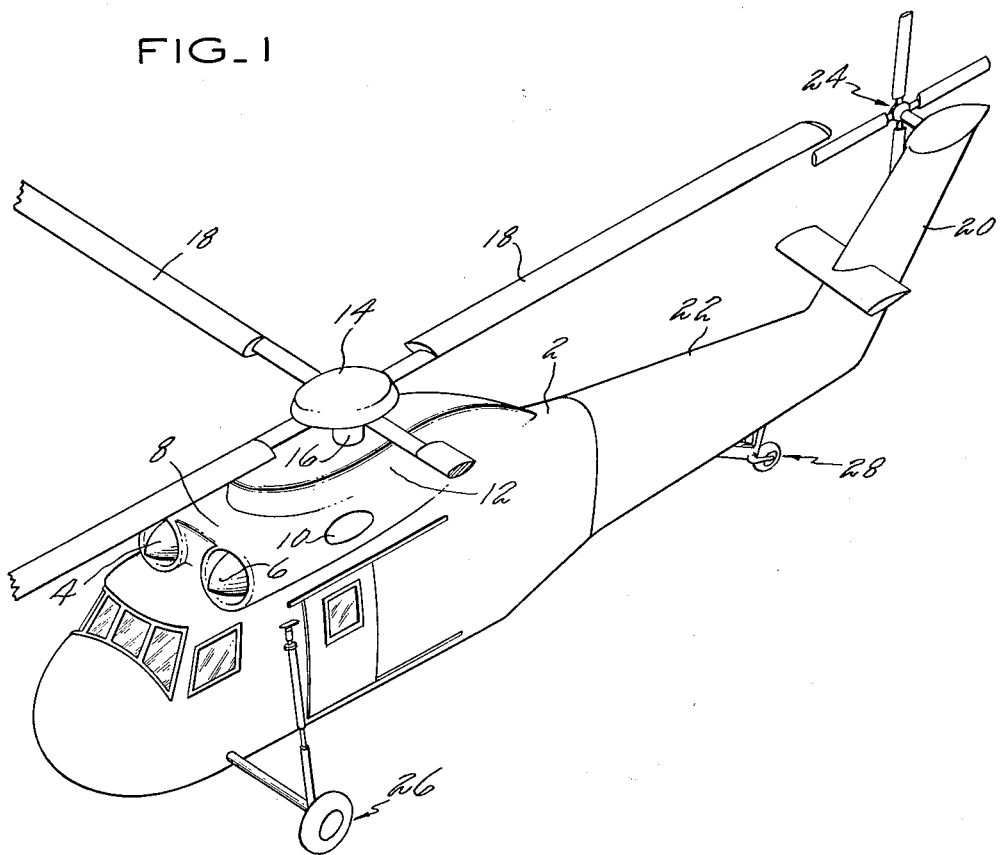
Fig. 1 is a perspective view of a helicopter having a power plant with two jet engines for driving its rotor system.
Figure 5:
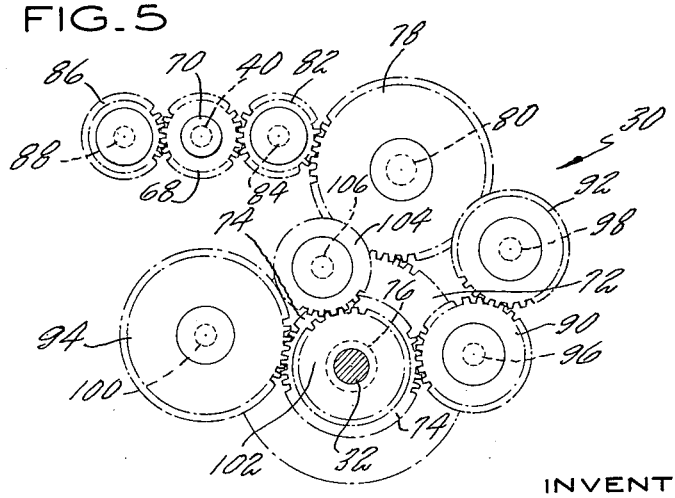
Fig. 5 is a view taken along the line 5—5 of Fig. 2.

While Fig. 1 shows a helicopter having a specific configuration, it is to be understood that the power transmission means can be used on any type of helicopter. Further, referring to Fig. 1, a helicopter is shown having a body 2 which generally houses the pilot and cargo or passenger compartments. The power plant is shown located on top of the helicopter comprising two gas turbine engines 4 and 6 which are mounted in a housing 8 in a side-by-side relationship. Their exhaust is directed from the side of the housing through openings 10. A main rotor pylon 12 covers the power transmission system and extends between the housing 8 and the body 2 of the helicopter. The main rotor head 14 is supported on the upper end of an upright drive shaft 16 which extends upwardly from the power transmission system. This system is connected between said drive shaft and two gas turbine engines 4 and 6. Rotor blades 18 are mounted on the rotor head in a usual manner. The helicopter may be controlled by any control mechanism desired; such a control mechanism is shown in the patent to Alex, U.S. Patent No. 2,811,324.

Figure 2:
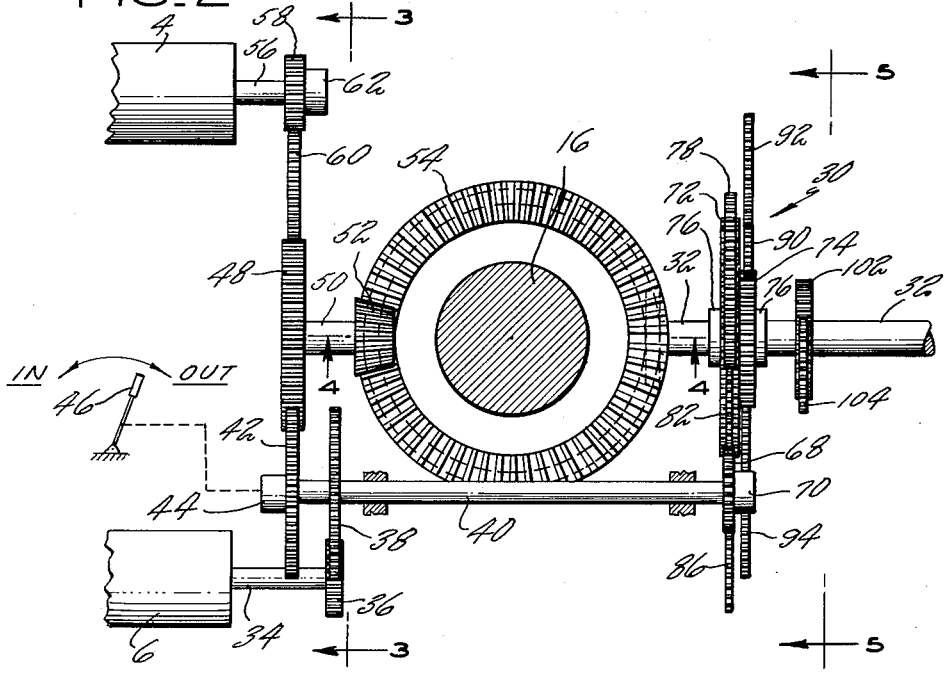
Fig. 2 is a schematic plan view of the power plant transmission system.
Figure 3:
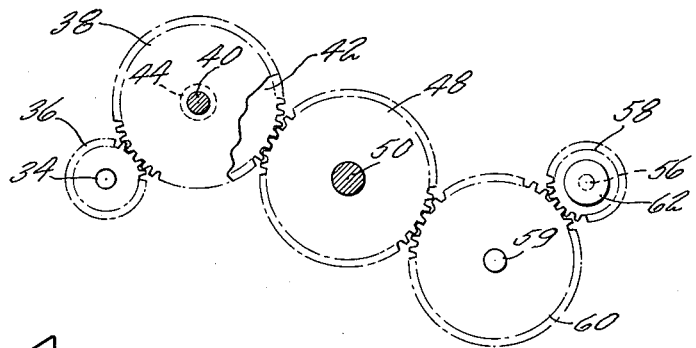
Fig. 3 is a section taken along the line 3—3 of Fig. 2.
Figure 4:
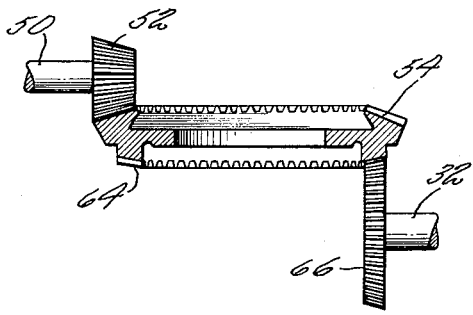
Fig. 4 is a view taken along the line 4—4 of Fig. 2.

A rear pylon 20 extends upwardly from the tail cone 22. A tail rotor 24 is mounted on said pylon. Conventional forward landing gear 26 and rear landing gear 28 are shown thereon. The power transmission system shown schematically in Fig. 2 is located between the two gas turbine engines 4 and 6 of the power plant and the drive shaft 16, accessory drive gear assembly 30, and the tail rotor drive shaft 32. Engine 6 has a drive shaft 34 with a pinion gear 36 mounted thereon which meshes with a spur gear 38 fixedly mounted on the forward part of accessory drive shaft 40. This drive shaft 40 is rotatably supported in the aircraft and extends in a longitudinal direction in said aircraft. A second spur gear 42 is mounted on accessory drive shaft 40 forwardly of gear 38. This gear 42 is mounted on the accessory drive shaft 40 by a freewheeling lock-up device 44 which will permit the shaft 40 to drive the gear 42 but will not permit the gear 42 to drive the shaft 40. However, further means are provided in the lock-up device 44 so that shaft 40 will also be unable to drive the gear 42. This means is manually controllable by a lever 46. When lever 46 is in its "Out" position, gear 42 is locked out of engagement with shaft 40 and will remain that way while lever 46 remains in its "Out" position. When lever 46 is in its "In" position, the free wheeling lock-up device will act as a mere one-way drive clutch between the shaft 40 and gear 42 so that shaft 40 can drive gear 42 but gear 42 cannot drive shaft 40. This is for a purpose to be hereinafter described.

The freewheeling lock-up device 44 can be a well-known one-way drive mechanism between two relatively moving members having balls or rollers providing the driving connection between said members when there is relative movement between said members in one direction by being cammed into position, and providing free movement between said members when there is relative movement between said members in the other direction. Said mechanism has restraining means for preventing said balls from being cammed into driving position by the normal relative movement between said members which provides the driving connection. A device of this type is shown in U.S. Patent No. 2,644,535 to A. L. Koup et al. for a Fluid Coupling Clutch.

A gear 42 meshes with a single driving gear 48 which is fixedly mounted on a shaft 50. This shaft 50 is rotatably mounted in the helicopter. A bevel gear 52 is also mounted on shaft 50 and engages a bevel gear 54 which is fixed to the rotor drive shaft 16.

Engine 4 has a drive shaft 56 with a pinion gear 58 mounted thereon which meshes with a spur gear 60 fixedly mounted on a shaft 59 which is mounted for rotation in the helicopter. Spur gear 60 also engages the single driving gear 48. Pinion gear 58 is mounted on the drive shaft 56 by a freewheeling device 62. This freewheeling device will permit shaft 56 to drive gear 58 but will not permit the gear 58 to drive the shaft 56. If, for some reason, the gear 60 is being driven at a greater speed than shaft 56, the gear 58 will merely free-wheel about the shaft 56.

Bevel gear 54 has a second set of bevelled teeth 64 mounted therearound which project downwardly from the gear. These teeth 64 mesh with a bevel gear 66 which is fixedly mounted to the tail rotor drive shaft 32.

A gear 68 is mounted on the rearward part of the accessory drive shaft 40 by a freewheeling device 70. This freewheeling device will permit accessory drive shaft 40 to drive gear 68 but will not permit the gear 68 to drive the shaft 40. Gears 72 and 74 are mounted on tail rotor drive shaft 32 by a freewheeling device 76. There is no relative motion provided between these two gears. This freewheeling device will permit shaft 32 to drive gears 72 and 74 but will not permit these gears 72 and 74 to drive the shaft 32.

Gear 72 meshes with a gear 78 which is fixedly mounted on a shaft 80 which is mounted for rotation in the helicopter. Gear 78 in turn meshes with a gear 82 which is fixedly mounted on a shaft 84 which is mounted for rotation in the helicopter. Gear 82 also meshes with gear 68 which, as stated above, is mounted on the rearward part of the accessory drive shaft.

Gears 78 and 82 are accessory drive gears and in a typical helicopter construction could be connected to operate a pump and generator, respectively. To complete the accessory drive gear assembly 30, a second generator drive gear 86 is shown mounted on a shaft 88 and meshing with gear 68. Three pump driving gears 90, 92 and 94 are also shown mounted on shafts 96, 98 and 100, respectively. Gears 90 and 94 mesh with gear 74 and gear 92 meshes with gear 90. Gear sizes are arranged so that gear 68 rotates faster than shaft 40 for given speeds of engines 4 and 6, respectively. A gear 102 is fixedly mounted on the tail rotor drive shaft 32 and meshes with a gear 104 which is mounted on a shaft 106 which is mounted for rotation in the helicopter. Gear 104 drives a tachometer.

*Operation*

In a helicopter incorporating a power transmission system such as just described, in the event it is desirable to merely operate the accessories of the helicopter, the lever 46 is placed in its "Out" position, which holds gear 42 out of engagement with shaft 40, and the engine 6 is started. It can be seen that engine 6 will rotate accessory drive shaft 40 by its drive shaft 34 through meshing gears 36 and 38. Since the lock-up device 44 is in its "Out" position, shaft 40 will merely rotate within gear 42. However, since 40 is rotating, it will drive gear 68 through the freewheeling device 70. Rotation of gear 68 will rotate gears 82 and 86 which are connected respectively to the two generators. Gear 82 will in turn rotate gear 78 which drives a pump.

Gear 78 which meshes with gear 72 imparts its motion thereto to rotate it. However, in view of the freewheeling device 76, the gear 72 merely rotates about the shaft 32 permitting this tail rotor drive shaft and main rotor drive shaft to remain stationary. Gear 72 does, however, rotate gear 74 which is fixed thereto and rotates on the same axis. Gear 74 in turn meshes with gears 90 and 94 and therefore drives these gears. The rotation of gears 90 and 94 operates the two pumps which are connected thereto. Gear 90 in turn drives gear 92 to provide power for the last accessory pump.

After the engine 6 has been running the accessories and it is desired to start the second engine, the engine 4 is started and drives the single driving gear 48 through gear 60 by its drive shaft 56 and pinion gear 58. Since the engine is driving shaft 56, the freewheeling device in turn connects the shaft 56 to the gear 58. Rotation of the single driving gear 48 starts the rotor drive shaft 16 in motion through the bevel gears 52 and 54. Rotation of bevel gear 54 in turn rotates integral bevel gear 64 to rotate the tail rotor drive shaft 32 through bevel gear 66.

As the speed of shaft 32 becomes greater than the speed of gears 72 and 74, this shaft begins to drive said gears. Gear 72 then rotates gear 78. The action of gear 74 is the same as when driven by gear 78. Gear 78 now drives gear 82 which in turn drives gear 68. In view of freewheeling device 70, the gear 68 will freewheel about the shaft 40. Gear 68 will drive gear 86 as it did before. Now with the rotation of shaft 32, the gear 102 will drive the gear 104 which is in turn attached to a tachometer.

To drivingly connect engine 6 to the single driving gear 48 which is now rotating and in turn rotating gear 42, the speed of the engine 6 is coordinated with the speed of engine 4 and the lever 46 is placed in its "In" position so that the engine 6 can drive gear 42 through its output shaft 34, gears 36 and 38, and shaft 40. These two engine speeds can be viewed by two speed indicators and the lever 46 moved manually or an automatic synchronous phasing mechanism can be used to control the lever in this regard. As mentioned hereinbefore, the gear 68, when rotated by gear 82, rotates faster than shaft 40 for a given input speed.

It is to be understood that the invention is not limited to the specific embodiment herein illustrated and described, but may be used in other ways without departure from its spirit as defined by the following claims.

I claim:

1. In an operative combination, a rotor, a power plant, said power plant having a drive shaft, an accessory drive means, first means connecting said power plant drive shaft to said accessory drive means so that said power plant drive shaft can drive said accessory drive means, a rotor drive shaft, second means connecting said rotor drive shaft to said accessory drive means so that said rotor drive shaft can drive said accessory drive means, third means connecting said power plant drive shaft to said rotor drive shaft so that said power plant drive shaft can drive said rotor drive shaft, and means for selectively driving said accessory drive means by said first means or said second and third means.

2. In an operative combination, a rotor, a power plant, said power plant having a drive shaft, an accessory drive means, said accessory drive means having a first drive shaft, said accessory drive means having a second drive shaft, first means connecting said power plant drive shaft to said first drive shaft so that said power plant drive shaft can drive said first accessory drive means, a rotor drive shaft, second means connecting said rotor drive shaft to said second drive shaft so that said rotor drive shaft can drive said second drive shaft, third means connecting said power plant drive shaft to said rotor drive shaft so that said power plant drive shaft can drive said rotor drive shaft, and means for selectively driving said accessory drive means by said first drive shaft or said second drive shaft.

3. In an operative combination, two rotors, a power plant, said power plant having a drive shaft, an accessory drive means, said accessory drive means having a first drive shaft and a second drive shaft, first means connecting said power plant drive shaft to said first drive shaft so that said power plant drive shaft can drive said accessory drive means, a first rotor drive shaft, second means connecting said rotor drive shaft to said second drive shaft so that said rotor drive shaft can drive said second drive shaft, third means connecting said power plant drive shaft to said rotor drive shaft so that said power plant drive shaft can drive said rotor drive shaft, said second rotor being driven by said second drive shaft, and means for selectively driving said accessory drive means by said first drive shaft or said second drive shaft.

4. In an operative combination, a rotor, a power plant, said power plant having two engines, a first engine having a drive shaft, an accessory drive means, first means connecting said first engine drive shaft to said accessory drive means so that said power plant drive shaft can drive said accessory drive means, a rotor drive shaft, second means connecting said rotor drive shaft to said accessory drive means so that said rotor drive shaft can drive said accessory drive means, third means connecting said first engine drive shaft to said rotor drive shaft so that said first engine drive shaft can drive said rotor drive shaft, means for selectively driving said accessory drive means by said first means or said second and third means, a second engine having a second drive shaft, and fourth means connecting said second drive shaft to said rotor drive shaft so that said second drive shaft can drive said rotor drive shaft.

5. In an operative combination, a rotor, a power plant, said power plant having two engines, a first engine having a drive shaft, an accessory drive means, said accessory drive means having a first accessory drive shaft, said accessory drive means having a second accessory drive shaft, first means connecting said first engine drive shaft to said first accessory drive shaft so that said first engine drive shaft can drive said first accessory drive means, a rotor drive shaft, second means connecting said rotor drive shaft to said second accessory drive shaft so that said rotor drive shaft can drive said second accessory drive shaft, third means connecting said first engine drive shaft to said rotor drive shaft so that said first engine drive shaft can drive said rotor drive shaft, means for selectively driving said accessory drive means through said first engine by said first accessory drive shaft or said second accessory drive shaft, a second engine having a second drive shaft, and fourth means connecting said second drive shaft to said rotor drive shaft so that said second drive shaft can drive said rotor drive shaft.

6. In an operative combination, two rotors, a power plant, said power plant having two engines, a first engine having a drive shaft, an accessory drive means, said accessory drive means having a first accessory drive shaft and a second accessory drive shaft, first means connecting said first engine drive shaft to said first accessory drive shaft so that said first engine drive shaft can drive said accessory drive means, a first rotor drive shaft, second means connecting said rotor drive shaft to said second accessory drive shaft so that said rotor drive shaft can drive said second accessory drive shaft, third means connecting said first engine drive shaft to said rotor drive shaft so that said first engine drive shaft can drive said rotor drive shaft, said second rotor being driven by said second drive shaft, means for selectively driving said accessory drive means through said first engine by said first accessory drive shaft or said second accessory drive shaft, a second engine having a second drive shaft, and fourth means connecting said second drive shaft to said rotor drive shaft so that said second drive shaft can drive said rotor drive shaft.

7. In an operative combination, a first rotor drive shaft, a second rotor drive shaft, means drivingly connecting said first rotor drive shaft and said second rotor drive shaft, a power plant, said power plant having a drive shaft, an output gear train means including a plurality of meshing gears, first means mounting one of said gears on said second rotor drive shaft, said first mounting means including a one-way drive so that said second rotor drive shaft can drive said gear, a gear train drive shaft, second means mounting one of the other of said gears on said gear train drive shaft, said second mounting means including a one-way drive so that said gear train drive shaft can drive said gear, and means for drivingly connecting the drive shaft of said power plant to drive said gear train drive shaft alone or together with the first rotor drive shaft.

8. In an operative combination, a first rotor and a second rotor, a first rotor drive shaft, a second rotor drive shaft, means drivingly connecting said first rotor drive shaft and said second rotor drive shaft, a power plant, said power plant having a first and second drive shaft, an output gear train means including a plurality of meshing gears, first means mounting one of said gears on said second rotor drive shaft, said first mounting means including a one-way drive so that said second rotor drive shaft can drive said gear, a gear train drive shaft, second means mounting one of the other of said gears on said gear train drive shaft, said second mounting means including a one-way drive so that said gear train drive shaft can drive said gear, means for drivingly connecting the first drive shaft of said power plant to drive said gear train drive shaft alone or together with the first rotor drive shaft, and means for drivingly connecting the second drive shaft of said power plant to said first rotor drive shaft.

9. In a power transmission system, an input shaft, a first output shaft, a second output shaft, means drivingly connecting said first and second output shafts, a third output gear train means including a plurality of meshing gears, first means mounting one of said gears on said second output shaft, said first mounting means including a one-way drive so that said second output drive shaft can drive said gear, a gear train drive shaft, second means mounting one of the other of said gears on said gear train drive shaft, said second mounting means including a one-way drive so that said gear train drive shaft can drive said gear, and means for drivingly connecting the input shaft to drive said gear train drive shaft alone or together with the first output shaft.

10. In a power transmission system, an input drive shaft, an intermediate drive shaft, means for driving said intermediate drive shaft from said input drive shaft, a first gear, first one-way drive means connecting said first gear to said intermediate drive shaft so that said shaft can drive said first gear, means for controlling said last named means so that said intermediate drive shaft can rotate freely in relation to said first gear, a first output drive shaft, means connecting said first gear to said first output drive shaft, a second output drive shaft, means connecting said first output drive shaft to said second output drive shaft, a second gear, second one-way drive means connecting said second gear to said intermediate drive shaft so that said intermediate drive shaft can drive said second gear, a third gear, third one-way drive means connecting said third gear to said second output drive shaft so that said second output drive shaft can drive said third gear, and gear means connecting said second and third gears, said gear means having an output means.

11. In a power transmission system, an input drive shaft, an intermediate drive shaft, means for driving said intermediate drive shaft from said input drive shaft, a first gear, first one-way drive means connecting said first gear to said intermediate drive shaft so that said shaft can drive said first gear, means for rendering said first one-way drive means inoperative so that said intermediate drive shaft is prevented from driving said first gear, a first output drive shaft, means connecting said first gear to said first output drive shaft, a second output drive shaft, means connecting said first output drive shaft to said second output drive shaft, a second gear, second one-way drive means connecting said second gear to said intermediate drive shaft so that said intermediate drive shaft can drive said second gear, a third gear, third one-way drive means connecting said third gear to said second output drive shaft so that said second output drive shaft can drive said third gear, gear means connecting said second and third gears, said gear means having an output means.

12. In a power transmission system, an input drive shaft, an intermediate drive shaft, means for driving said intermediate drive shaft from said input drive shaft, a first gear, first one-way drive means connecting said first gear to said intermediate drive shaft so that said shaft can drive said first gear, manual means for rendering said first one-way drive means inoperative so that said intermediate drive shaft is prevented from driving said first gear, a first output drive shaft, means connecting said first gear to said first output drive shaft, a second output drive shaft, means connecting said first output drive shaft to said second output drive shaft, a second gear, second one-way drive means connecting said second gear to said intermediate drive shaft so that said intermediate drive shaft can drive said second gear, a third gear, third one-way drive means connecting said third gear to said second output drive shaft so that said second output drive shaft can drive said third gear, and gear means connecting said second and third gears, said gear means having an output means.

13. In a power transmission system, two input drive shafts, an intermediate drive shaft, means for driving said intermediate drive shaft from one of said input drive shafts, a first gear, first one-way drive means connecting said first gear to said intermediate drive shaft so that said shaft can drive said first gear, means for controlling said last named means so that said intermediate drive shaft can rotate freely in relation to said first gear, a first output drive shaft, means connecting said first gear to said first output drive shaft, a second output drive shaft, means connecting said first output drive shaft to said second output drive shaft, a second gear, second one-way drive means connecting said second gear to said intermediate drive shaft so that said intermediate drive shaft can drive said second gear, a third gear, third one-way drive means connecting said third gear to said second output drive shaft so that said second output drive shaft can drive said third gear, gear means connecting said second and third gears, said gear means having an output means, and fourth one-way drive means connecting the other of said input drive shafts to said first output drive shaft so that said input drive shaft can drive said first output drive shaft.

14. In an operative combination, a first rotor and a second rotor, a power plant, said power plant having a drive shaft, an accessory drive shaft, means for driving said accessory drive shaft from said power plant drive shaft, a first gear, one-way drive means connecting said first gear to said accessory drive shaft so that said accessory drive shaft can drive said gear, means for controlling said last named means so that said accessory drive shaft can rotate freely in relation to said first gear, a first rotor drive shaft, means connecting said first gear to said first rotor drive shaft, a second rotor drive shaft, means connecting said first rotor drive shaft to said second rotor drive shaft, a second gear, second one-way drive means connecting said second gear to said accessory drive shaft so that said accessory drive shaft can drive said second gear, a third gear, third one-way drive means connecting said third gear to said second rotor drive shaft so that said second rotor drive shaft can drive said third gear, and gear means connecting said second and third gears, said gear means having an output means.

15. In an operative combination, a first rotor and a second rotor, a power plant, said power plant having two engines, a first engine having a drive shaft, an accessory drive shaft, means for driving and accessory drive shaft from said drive shaft of said first engine, a first gear, one-way drive means connecting said first gear to said accessory drive shaft so that said accessory drive shaft can drive said gear, means for controlling said last named means so that said accessory drive shaft can rotate freely in relation to said first gear, a first rotor drive shaft, means connecting said first gear to said first rotor drive shaft, a second rotor drive shaft, means connecting said first rotor drive shaft to said second rotor drive shaft, a second gear, second one-way drive means connecting said second gear to said accessory drive shaft so that said accessory drive shaft can drive said second gear, a third gear, third one-way drive means connecting said third gear to said second rotor drive shaft so that said second rotor drive shaft can drive said third gear, gear means connecting said second and third gears, said gear means having an output means, a second engine having a second drive shaft, and fourth one-way drive means connecting said second drive shaft to said first rotor drive shaft so that said second drive shaft can drive said first rotor drive shaft.

References Cited in the file of this patent

UNITED STATES PATENTS

| | | |
|---|---|---|
| 2,094,298 | Laub | Sept. 28, 1937 |
| 2,717,523 | Lammerz | Sept. 13, 1955 |
| 2,771,790 | Munschauer | Nov. 27, 1956 |
| 2,811,324 | Alex | Oct. 29, 1957 |
| 2,825,243 | Wrinkle | Mar. 4, 1958 |
| 2,854,818 | Fortmann et al. | Oct. 7, 1958 |